US008179917B2

(12) United States Patent
Chan et al.

(10) Patent No.: US 8,179,917 B2
(45) Date of Patent: May 15, 2012

(54) SYSTEM AND METHOD FOR REPEATER IN A POWER LINE NETWORK

(75) Inventors: Tat Keung Chan, South San Francisco, CA (US); Ray Liang, Shenzhen (CN)

(73) Assignee: Asoka USA Corporation, Santa Clara, CA (US)

( * ) Notice: Subject to any disclaimer, the term of this patent is extended or adjusted under 35 U.S.C. 154(b) by 820 days.

(21) Appl. No.: 11/945,111

(22) Filed: Nov. 26, 2007

(65) Prior Publication Data

US 2009/0135848 A1 May 28, 2009

(51) Int. Cl.
*H04J 3/16* (2006.01)

(52) U.S. Cl. .................... 370/466; 370/395.5; 370/401

(58) Field of Classification Search .................. 370/464, 370/395.5, 351, 445, 395.31, 395.53; 709/237, 709/250, 249, 246; 726/15; 455/422.1
See application file for complete search history.

(56) References Cited

U.S. PATENT DOCUMENTS 5,193,151 A * 3/1993 Jain .............................. 709/237
6,912,592 B2 * 6/2005 Yip .............................. 709/249
7,016,368 B2 3/2006 Binder
7,035,280 B2 4/2006 Binder
7,095,756 B2 8/2006 Binder
7,136,936 B2 * 11/2006 Chan et al. .................... 709/250
7,173,935 B2 * 2/2007 Lou et al. .................. 370/395.5
7,180,899 B2 * 2/2007 De Silva et al. ......... 370/395.31
7,356,841 B2 * 4/2008 Wilson et al. .................. 726/15
2005/0076148 A1 * 4/2005 Chan et al. .................... 709/246
2006/0002370 A1 * 1/2006 Rabie et al. .................. 370/351
2006/0160533 A1 * 7/2006 Chou et al. ................ 455/422.1
2006/0251115 A1 * 11/2006 Haque et al. ................. 370/466
2007/0058659 A1 * 3/2007 Ayyagari et al. .............. 370/445
2007/0110078 A1 * 5/2007 De Silva et al. ......... 370/395.53

* cited by examiner

*Primary Examiner* — Kwang B Yao
*Assistant Examiner* — Vincelas Louis
(74) *Attorney, Agent, or Firm* — Baker Botts L.L.P.

(57) ABSTRACT

System and method for repeater in a power line network. According to an embodiment, the present invention provides a method for power line communication network. The method includes providing a virtual local area network (VLAN), which VLAN includes at least a repeater, a client, and a gateway. The VLAN is associated with a network encryption key. The repeater is associated with a first identification. The client is associated with a second identification. The gateway is associated with a third identification. The first identification and the third identification are a service identification type. The second identification is a client identification type. The method also includes providing a power line network that is configured to transmit data through OFDM signaling. The method includes sending a first data packet in first format from the client through the power line network. The method additionally includes receiving the first data packet by the repeater through the power line network at through a first network interface.

19 Claims, 8 Drawing Sheets

SYSTEM AND METHOD FOR REPEATER IN A POWER LINE NETWORK

BACKGROUND OF THE INVENTION

The present invention relates generally to power line networking techniques. More particularly, the invention provides an apparatus for a repeater in a high speed power line network. Merely by way of example, the invention has been applied in a local area network environment, where the range of power line communication network is extended through the use of repeaters, but it would be recognized that other applications exist. The invention can also be applied to building area networking, home networking, office networking, apartments, any combination of these, and other networking applications.

With the advent of computer and network technologies, telecommunication techniques in the recent years have quickly developed. Among others, data communication has become a necessity for the lives of many people. People use data telecommunication networks for a variety of applications, such as the Internet, file transfer, emails, and more recently, media contents.

Many types of network architectures are currently being used, and more often than not, a network often consists of different network architectures. In recent year, power line communication networks have been gaining popularity. Using existing power lines, power line networks are often cheaper to implement than other types of networks, as no dedicated network cable is required. Typically, power line networks are deployed as a part of a local area network. Sometimes, power line networks are implemented in conjunction with wireless networks, thereby improving performance and reliability.

One of the challenges to using power line communication networks has been the limited range of certain types of power line network signals. To address this problem, various types of conventional repeaters have been developed for power line networks. Unfortunately, these conventional repeaters are often inadequate.

Therefore, improved system and method for power line network repeater is desired.

BRIEF SUMMARY OF THE INVENTION

The present invention relates generally to power line networking techniques. More particularly, the invention provides an apparatus for a repeater in a high speed power line network. Merely by way of example, the invention has been applied in a local area network environment, where the range of power line communication network is extended through the use of repeaters, but it would be recognized that other applications exist. The invention can also be applied to building area networking, home networking, office networking, apartments, any combination of these, and other networking applications.

In various embodiments, the present invention provides a repeater system in a power line communication network where only a single power line module is used. A network processor, through the use of unique virtual local area identification scheme, is able to process both uplink and downlink data.

According to an embodiment, the present invention provides a method for power line communication network. The method includes providing a virtual local area network (VLAN), which VLAN includes at least a repeater, a client, and a gateway. The VLAN is associated with a network encryption key. The repeater is associated with a first identification. The client is associated with a second identification. The gateway is associated with a third identification. The first identification and the third identification are a service identification type. The second identification is a client identification type. The method also includes providing a power line network that is configured to transmit data through OFDM signaling. The method includes sending a first data packet in first format from the client through the power line network. The method additionally includes receiving the first data packet by the repeater through the power line network at through a first network interface. The method further includes converting the first data packet from the first format to a second format by a power line module of the repeater. The method further includes processing the first data packet by a network processor of the repeater. In addition, the method includes determining at least routing information based at least on the second identification by the network processor. Also, the method includes updating the first data packet by the network processor. Moreover, the method includes converting the processed first data packet from the second format to the first format. The method includes sending the processed first data packet to the power line network through the first network interface. Additionally, the method includes receiving the processed first data packet by the gateway.

According to another embodiment, the present invention provides a system for a repeater in a power line network. The system includes a coupler being coupled to a power line network, which includes a virtual local area network (VLAN). The VLAN is associated with a first network encryption key. For example, the VLAN is on top of a power line communication network, which uses only one NEK. The system is associated with a first identification that is associated with a service identification type. The system also includes an analog front end module that is adapted to receive and send a first data packet in a first format. The first format comprises an orthogonal frequency division multiplex (OFDM) format. The analog front end module is coupled to the coupler. The first data includes a first segment and a second segment. The first segment includes a second identification, the second identification being associated with a client identification type. The system also includes a power line module being configured to receive and convert the first data packet from the analog front end from the first format to a second format and further being configured to convert a second data packet from the second format into a second format. The power line module is adapted to send a second data packet, the second data packet being associated with a third identification. In addition, the system includes a network processor that is configured to process the first data packet in the second format. The network processor is adapted to determine routing information based at least on the second identification. The network processor is further adapted to update the second segment to include information associated with the first identification.

It is to be appreciated that embodiments of the present invention provides various advantages over conventional techniques. Among other things, by using a single, instead of multiple, power line module to implement repeaters, the cost and the size of repeater systems are greatly reduced. In addition, through software controls, the repeater systems according to the present invention provide an efficient and effective way to route network traffic with added security features. Furthermore, it is to be appreciated that certain embodiment of the present invention are backward compatible and can be implemented in conjunction with existing power line systems. There are other benefits as well.

Various additional objects, features and advantages of the present invention can be more fully appreciated with reference to the detailed description and the accompanying drawings that follow.

DETAILED DESCRIPTION OF THE INVENTION

The present invention relates generally to power line networking techniques. More particularly, the invention provides an apparatus for a repeater in a high speed power line network. Merely by way of example, the invention has been applied in a local area network environment, where the range of power line communication network is extended through the use of repeaters, but it would be recognized that other applications exist. The invention can also be applied to building area networking, home networking, office networking, apartments, any combination of these, and other networking applications.

As stated above, conventional power line network repeaters are often inadequate. Typically, conventional repeaters requires to interfaces: one for receiving and one for transmitting. For power line communication related applications, two or more power line modules (one for each interface) are often necessary.

Figure 1:
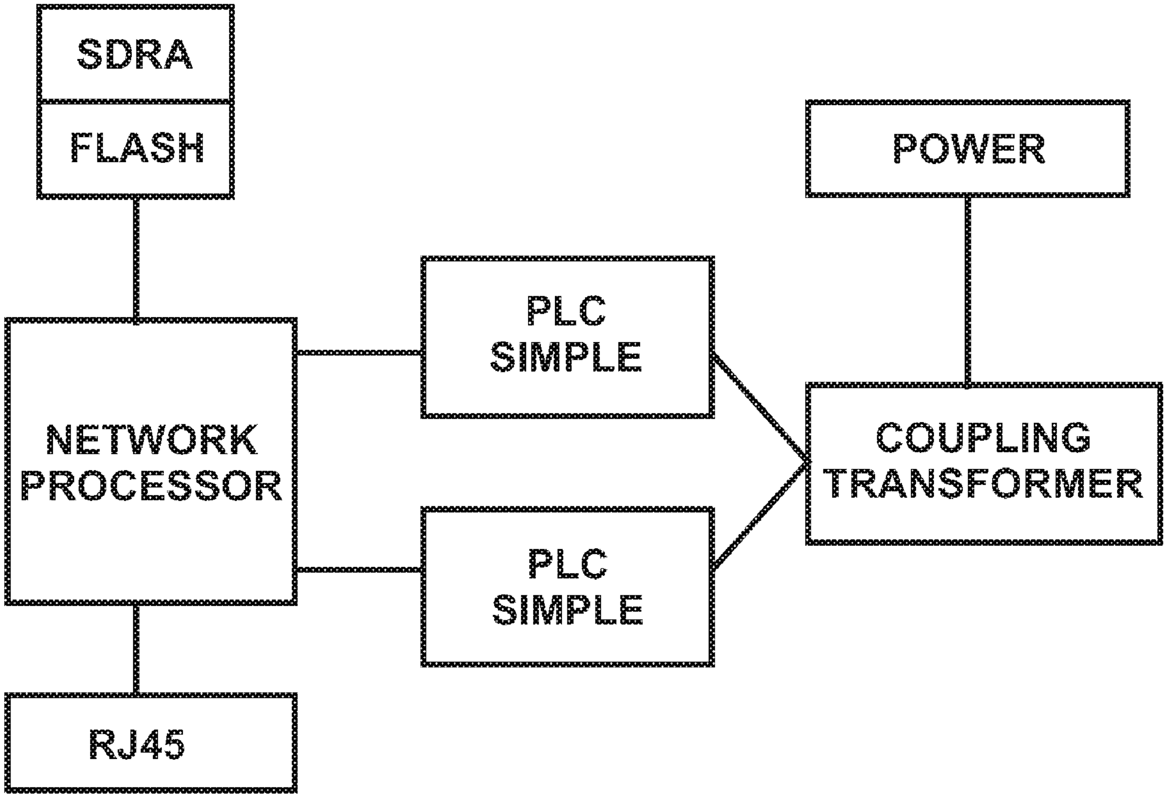
FIG. 1 is a simplified diagram illustrating a conventional power line network repeater.

FIG. 1 is a simplified diagram illustrating a conventional power line network repeater. As shown, the repeater has two power line communication (PLC) modules. Typically, one PLC module is specifically used for receiving incoming data, and the other PLC module is used for sending outgoing data. Typically, each PLC module is identified by a network address (e.g., port number, etc.). For example, the network traffic is separated into incoming and outing when the network processor processes (e.g., determine routing information, update data packet header, etc.) data traffic.

Embodiments of the present invention offer various advantages over conventional techniques. Among other things, repeaters according to the present invention are specifically configured to intelligently control the traffic. For example, only a single PLC module is used in a repeater system according to the present invention. The network processor use software control to determine where the data packets are coming from or going to. In various embodiments, the network processor determines routing information for data packets based on virtual local area network (VLAN) identification. For example, the use of VLAN in a power line network is described in U.S. Pat. No. 7,136,936, which is herein incorporated by reference.

Figure 2:
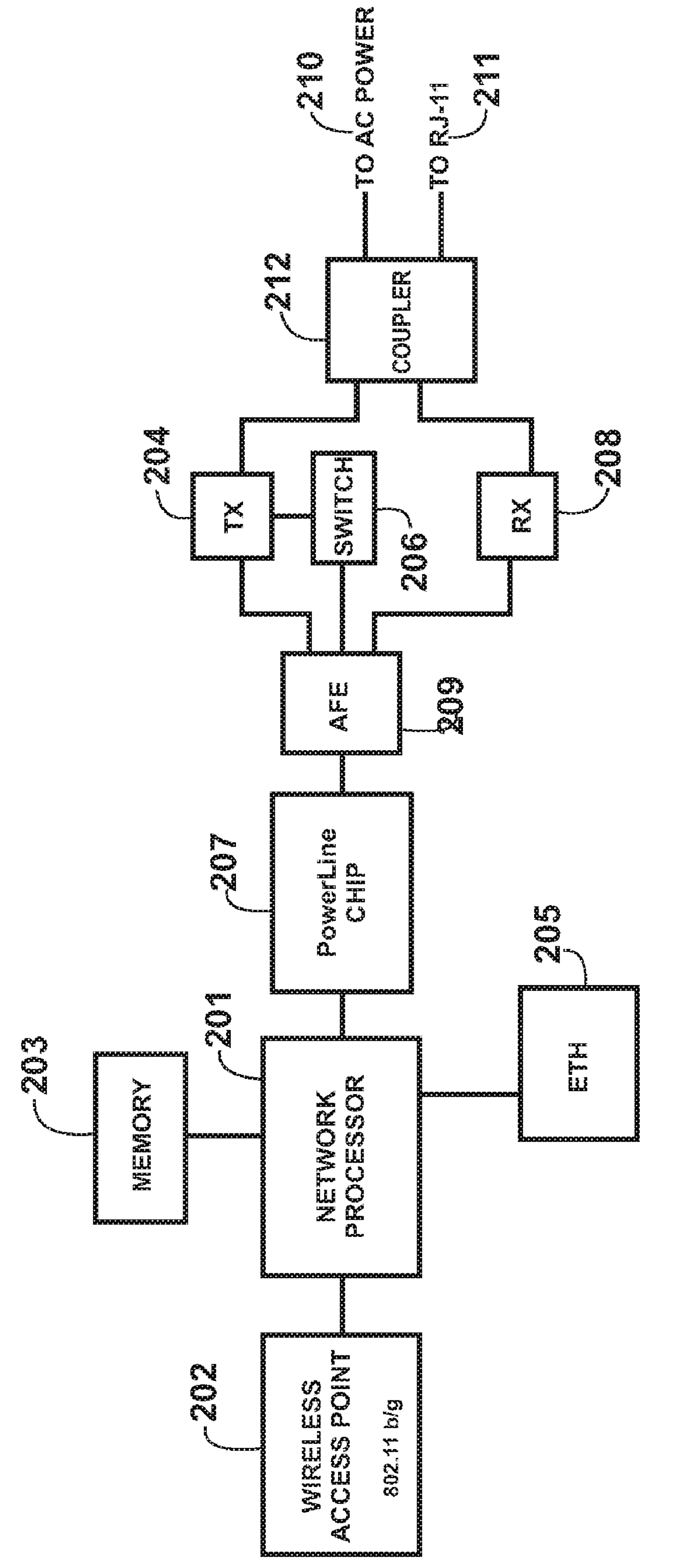
FIG. 2 is a simplified diagram illustrating a power line network repeater according to an embodiment of the present invention.

FIG. 2 is a simplified diagram illustrating a power line network repeater according to an embodiment of the present invention. This diagram is merely an example, which should not unduly limit the scope of the claims. One of ordinary skill in the art would recognize many variations, alternatives, and modifications.

As shown in FIG. 2, a power line repeater system 200 includes the following components:

1. a network processor 201;
2. a wireless access point 202;
3. a memory 203;
4. an ether port 205;
5. a power line chip 207;
6. an analog front end (AFE) 209;
7. a transmit device 204;
8. a receive device 208;
9. a switch device 206; and
10. a coupler 212.

According to various embodiments, the power line repeater system 200 is to provide network services (e.g., extend the range of power line devices) in a power line network where a virtual local area network is adapted. Network entities (such as gateway, repeater, etc.) are identified by a unique VLAN identification. For example, a VLAN ID may be indicated by predetermined field for the VLAN ID in a data packet on the power line network. In a specific application, network clients in a power line network are identified by VLAN IDs that have values range from 1 to 2047, while network service entities (e.g., repeater, router, etc.) are identified by VLAN IDs that have values range from 2048-4096. The VLAN IDs in various applications also help provide network security in conjunction with network encryption keys (NEK). For example, each VLAN is identified by a single NEK, and the VLAN ID is used to differentiate and allow policy control for network entities within a VLAN. In various embodiments, all VLAN ID share same NEK, which differs from conventional PLC repeaters which use two SM (simple module). For example, only one NEK is allowed on each SM.

The repeater system 200 has the power line chip 207, called herein "PLC" chip, which is coupled between the network processor 201 and an analog front end 209 device. As shown, the PLC is coupled to the analog front end (AFE) device and/or module. The AFE module interfaces between the PLC chip and a phase coupler 619 according to a specific embodiment. Between the AFE and coupler is transmit 204 and receive 208 devices according to a specific embodiment. A switching device 206 couples to the AFE chip and transmit device according to a specific embodiment. Further details of the power line chip, AFE, TX/RX devices, and coupler are provided throughout the present specification and more particularly below.

In a specific embodiment, the power line chip 207 can be any suitable power line integrated circuit chips and/or chip sets. As merely an example, the power line chip 207 is an integrated circuit chip sold under part number 5500CS manufactured by INTELLON CORPORATION of Florida. Here, the chip can be a single-chip power line networking controller with integrated MII/GPSI, USB. The chip interfaces with Ethernet interfaces, among others. Preferably, there is at least a 80 Mbps data rate on the power line, although others may desirable. Additional features include an Integrated 10-bit ADC, 10-bit DAC and AGC, a selectable MDI/SPI PHY management interface, general purpose 8-wire serial PHY data interface. Preferably, the signal processing uses Orthogonal Frequency Division Multiplexing (OFDM) for high data reliability, as well as adaptive channel characterization, Viterbi and block coding. In alternative embodiments, the power line device can also include other chip designs that are suitable for the present methods and systems. Of course, one of ordinary skill in the art would recognize other variations, modifications, and alternatives.

In a specific embodiment, the coupler 212 can be any suitable device capable of injecting and/or receiving power line signals to and/from a power line, which is coupled to a power line network. In a specific embodiment, the coupler can be an inductive coupler and/or capacitive coupler, but may be others. As merely an example, the coupler (either inductive and/or capacitive coupler), but can be others. The coupler couples to AC power line 210, which is provided on the power line network. Additionally, the coupler or other coupling device is coupled to an RF-11 outlet 619 for telephone communication. Of course, there can be many variations, modifications, and alternatives.

As explained above, only a single power line chip is needed in the repeater system 200. In contrast to conventional techniques where two power line chips are necessary for inbound and outbound traffic, both inbound and outbound network traffic goes through the same power lien chip, and the routing is controlled by the network processor 201. For example, the memory 203 includes instructions for the network processor 201 to control the flow and routing of network packet.

As an example, the couple 212 is connected to a power line network through the AC power. As explained above, the power line network includes a virtual local area network (VLAN), which is associated with a first network encryption key. As explained above, the repeater system 200 is identified by a VLAN ID, which is associated with a network service type of ID and has a range of between 2048 to 4096.

The analog front end device 209 is adapted to receive and send a data packet in a format that is specifically for data transmission using orthogonal frequency division multiplex (OFDM) techniques. As shown in FIG. 2, the analog front end module is coupled to the coupler, which provides a gateway to the power line network.

According to an embodiment, the data packet includes two or more segment. One segment, which may be the header or the trailer section of the data packet, is used to include network related information, such as routing information, the origination entity and destination entity for the data, etc. The other segment is the data segment. As an example, the data packet is from a client, and the header of the data segment indicates that the original entity is identified by a VLAN ID that has a value of between 1 to 2047.

The power line chip 207 is configured to receive and convert the data packet from the analog front end from the OFDM format and convert it to a different format (e.g., IP format, etc.). The power line chip 207 is also adapted to convert data packets into OFDM format for the purpose of outgoing data transmission.

The network processor 201 is specifically provide network routing for data packets. For example, the network processor 201 determines where to route a data packet and processes the data packet accordingly.

Figure 3:
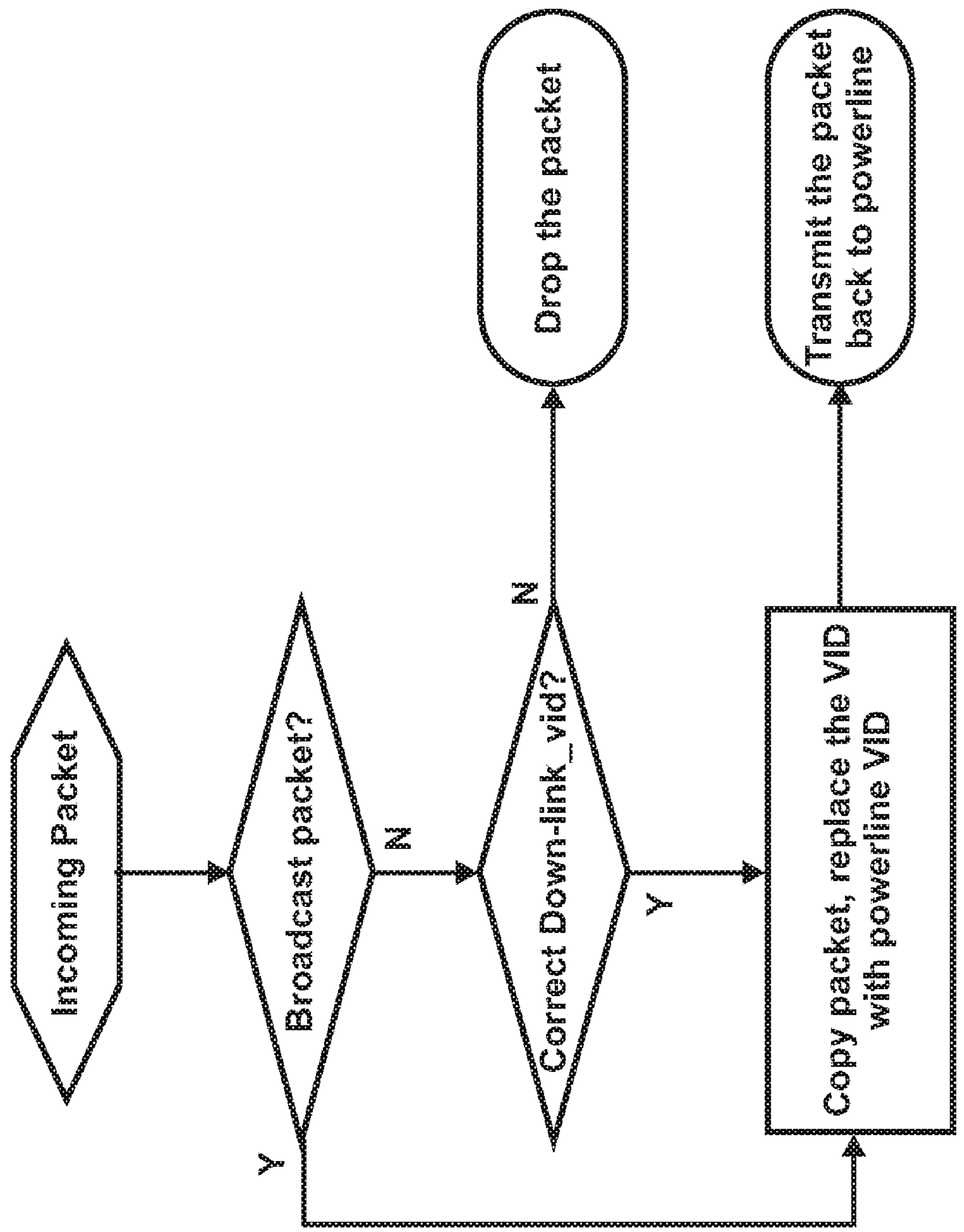
FIG. 3 is a simplified flow diagram illustrating the processing of a downlink data packet according to an embodiment of the present invention.

FIG. 3 is a simplified flow diagram illustrating the processing of a downlink data packet according to an embodiment of the present invention. This diagram is merely an example, which should not unduly limit the scope of the claims. One of ordinary skill in the art would recognize many variations, alternatives, and modifications. For example, various steps may be added, removed, repeated, rearranged, replaced, modified, and/or overlapped.

As shown in FIG. 3, when a data packet is received from the power line network, the network processor processes the data packet and determines whether the data packet is a broadcast packet. According to embodiments, broadcast packets are sent out by various entities to, among other things, determine how to route data packets. If the network processor determines that the data packet is a broadcast packet, the network processor makes a copy of the data packet, and updates the VID of the copied packet. For example, the updated VID allows the data packet to be routed corrected. In an embodiment, the updated VID includes the VID of the repeater, which ensures that the same data packet does not come back to the network repeater.

If the network processor determines that the data packet is not a broadcast packet, the network processor determines the VID for the downlink transmission. If the VID is determined to be incorrect, the network processor drops the packet. On the other hand, if the VID is determined to be correct, the network processor processes the data packet to update the VID, which ensures that the same data packet does not come back to the network repeater and is properly routed to the intended destination. For example, the updated VID is associated with the downlink of the repeater system.

Figure 4:
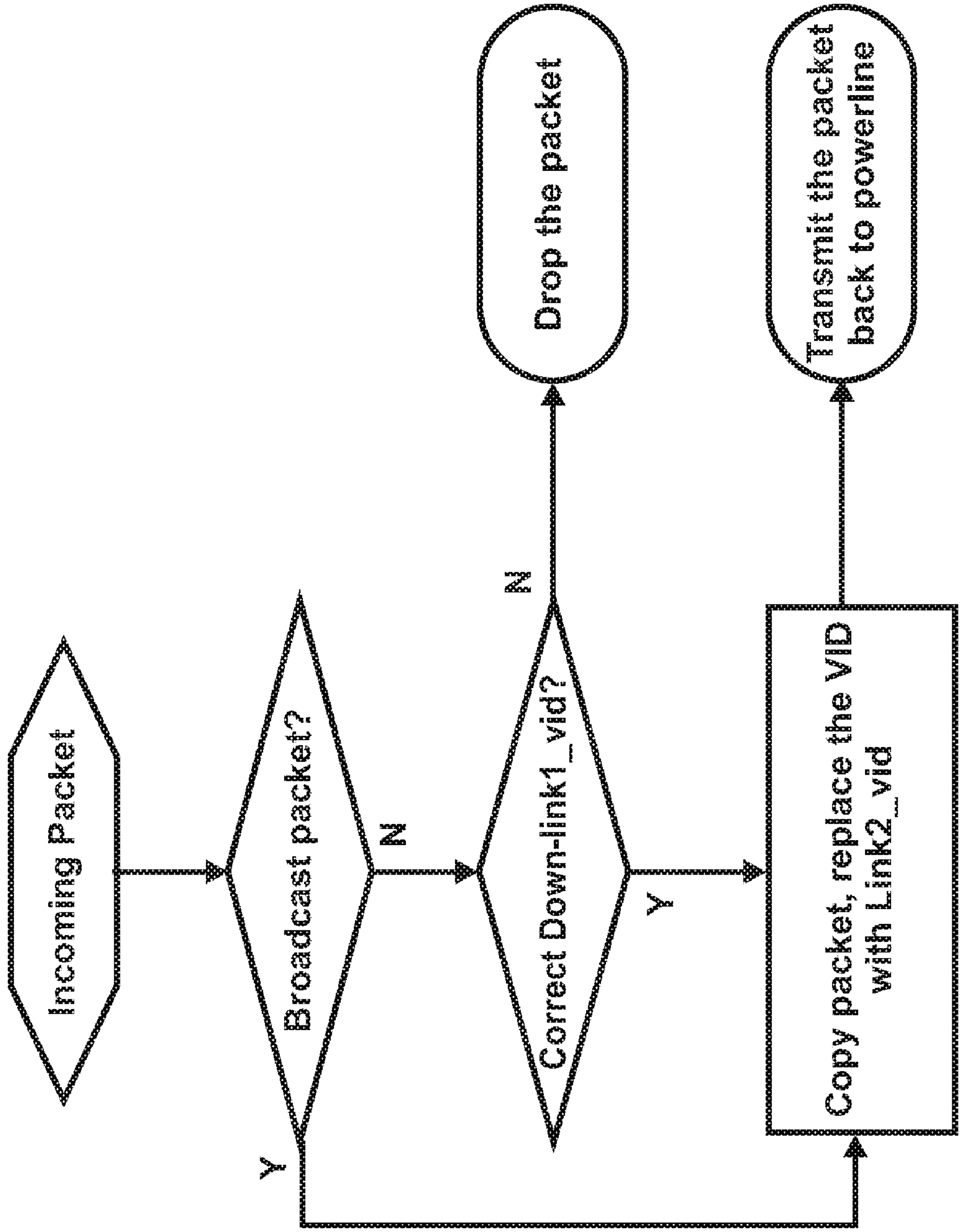
FIG. 4 is a simplified flow diagram illustrating the processing of an uplink data packet according to an embodiment of the present invention.

FIG. 4 is a simplified flow diagram illustrating the processing of an up link data packet according to an embodiment of the present invention. This diagram is merely an example, which should not unduly limit the scope of the claims. One of ordinary skill in the art would recognize many variations, alternatives, and modifications. For example, various steps may be added, removed, repeated, rearranged, replaced, modified, and/or overlapped.

As shown in FIG. 4, when a data packet is to be sent to the power line network, the network processor first processes the data packet and determines whether the data packet is a broadcast packet. According to embodiments, broadcast packets are sent by various entities to, among other things, determine how to route data packets. If the network processor determines that the data packet is a broadcast packet, the network processor makes a copy of the data packet, and updates the VID of the copied packet. For example, the updated VID allows the data packet to be routed corrected. In an embodiment, the updated VID includes the VID of the repeater, which ensures that the same data packet does not come back to the network repeater.

If the network processor determines that the data packet is not a broadcast packet, the network processor determines the VID for the downlink transmission. If the VID is determined to be incorrect, the network processor drops the packet. On the other hand, if the VID is determined to be correct, the network processor processes the data packet to update the VID, which ensures that the same data packet does not come back to the network repeater and is properly routed to the intended destination. For example, the updated VID is associated with the uplink of the repeater system. When the data packet is sent out from the repeater system, the data packet does not loop back, as the VID correctly helps identify that the data packet has already passed through the repeater system.

It is to be appreciated the embodiments of the present invention provide software control (e.g., through the network processor) for routing both incoming and outgoing data. As a result, the routing of data packet requires only a single port, and the downlink and uplink data packets are differentiated by the VIDs. In addition, since VID values are dividied into two groups, present invention allows VID network entities to properly determine various routing-related information for data packets. In addition, since the VIDs are software controlled, various logical communication links can be established through the network repeater without having to allocating physical links, thereby allows the network efficiently allocated the limited resources.

Figure 5:
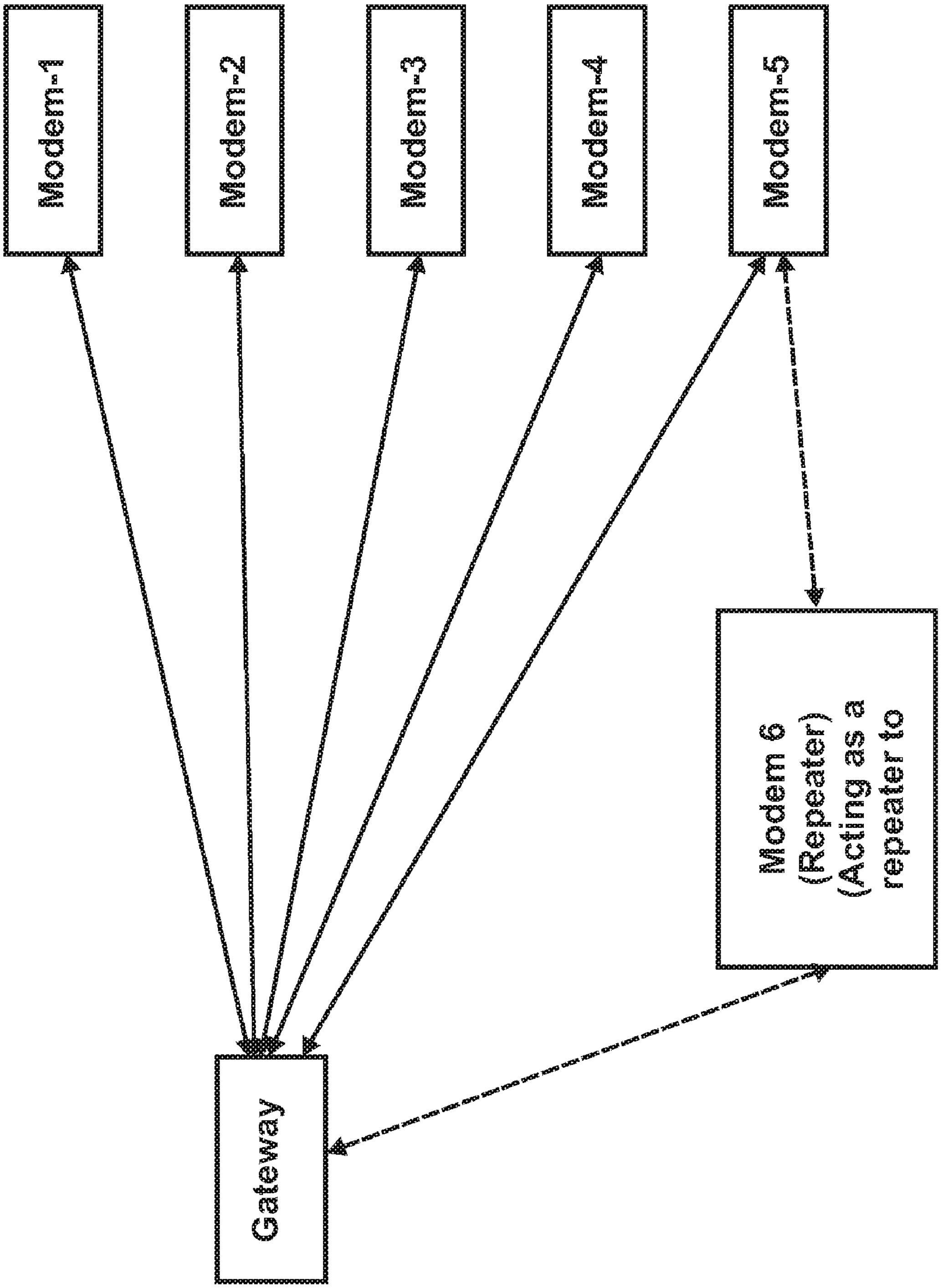
FIG. 5 is a simplified diagram illustrating a repeater system being used in a power line communication network according to an embodiment of the present invention.

FIG. 5 is a simplified diagram illustrating a repeater system being used in a power line communication network according to an embodiment of the present invention. This diagram is merely an example, which should not unduly limit the scope of the claims. One of ordinary skill in the art would recognize many variations, alternatives, and modifications.

As shown in FIG. 5, the modem 6 functions as a repeater between the modem 5 and the gateway within a power line communication network. During the process of relaying data packets, the repeater updates the VLAN ID of the data packet and provides the modem with a proxy VLAN ID. As an example, the Table 1 below shows the VID associated with each of the network entities. As shown, the modems (e.g., client network) associated with network VLAN ID of 1, 2, 3, 4, 5, and the repeater has an VLAN ID of 6. The modem 5, as shown in FIG. 5, communicates to the gateway through the repeater using a proxy VLAN ID, which is 4095-5.

| Modem MAC | VLAN id | Mode of operation | "Proxy" VLAN ID |
|---|---|---|---|
| Modem-1 MAC | 1 | | |
| Modem-2 MAC | 2 | | |
| Modem-3 MAC | 3 | | |
| Modem-4 MAC | 4 | | |
| Modem-5 MAC | 5 | | 4095-5 |
| Repeater MAC | 6 | Repeater for Modem-5 | |

The pseudo codes below illustrates the implementation of the repeater operation:

```
Struct
{
        Uchar Mode__operation;
```

-continued

```
        Uchar Modem__mac[6];
        Uchar org__vlan__id;
        Uchar down__fake__vlanid;
}
```

As an example, the operation has two main steps: (1) MME packet transaction, and (2) data packet transaction.

MME packet transaction: when the Repeater receives a MME packet, it checks for the Destination MAC address. If destination MAC address is broadcast, then the repeater makes a copy of it. One packet will be sent to the local processing and other will be sent on the power line without any modification.

On the other hand, if the destination MAC address is Modem-5 or Gateway MAC address then it will just send the packet to the power line without any modification.

According to embodiments, once the Repeater gets the VLAN ID from the Gateway, it sends the Vendor specific MME with its mode of operation and the MAC address of Modem 5 to the gateway. The gateway then sends a reply to this MME with the following information if the received MAC (Modem 5) is already authenticated with it. For example, the reply includes an "Org_vlan_id" of modem-5 and the modem sends a down_proxy_vlanid. The proxy VLAN ID is used for down link communication between the gateway and Modem-5 (e.g., down Proxy VLAN ID starts from 3838 and decrements to 3583, while the up Proxy VLAN ID will starts from 4094 and decrements to 3839).

Once the Repeater gets a reply from the Gateway, it sends a Vendor specific MME to Modem-5 with the Proxy VLAN ID, which the Modem 5 uses to send packets that are destined to the Gateway (up_Proxy_vlanid). For example, the Proxy VLAN ID is dn_proxy_vlanid-1.

For data packet transaction, if a packet is intended for the repeater, then the Gateway uses the Repeater VLAN ID for communication. If a packet is intended for the Modem 5, then the Gateway uses dn_proxy_vlan_id. The Table 2 below provides a detailed example for Gateway and Modem processes upon receiving or before transmitting the packet:

TABLE 2

| | Down link (sending packet over the Powerline) | Up link |
|---|---|---|
| Gateway | If GWY is transmitting a pkt over the power line which is intended for Modem-5 (or the device connected behind it):<br>A: If Gateway receive last packet from Modem-5 or device behind it is tagged with up__Proxy__vlanid,<br>then it has to insert Modem-5 vlanid in the pkt.<br>else<br>B: then it has to insert dn__Proxy__vlanid in the pkt.<br>If GWY is transmitting a pkt over the power line which is intended to Modem 6 (Repeater) or the device connected behind that then the Gateway has to use the vlan id of the Modem 6 (Repeater) in the pkt. | When the Gateway receives a packet, it will process the pkt normally.<br>(For Modem-5, packet with up__Proxy__vlanid will be accepted too) |
| Modem | If Modem is transmitting the pkt over the power line then it has to insert up__proxy__vlanid in the pkt | When the Modem receives a packet, it will process the pkt normally, it is not required to do any extra check on the pkt.<br>(Modem-5 will also accept packet with down__Proxy__vlanid packet) |

Figure 6:
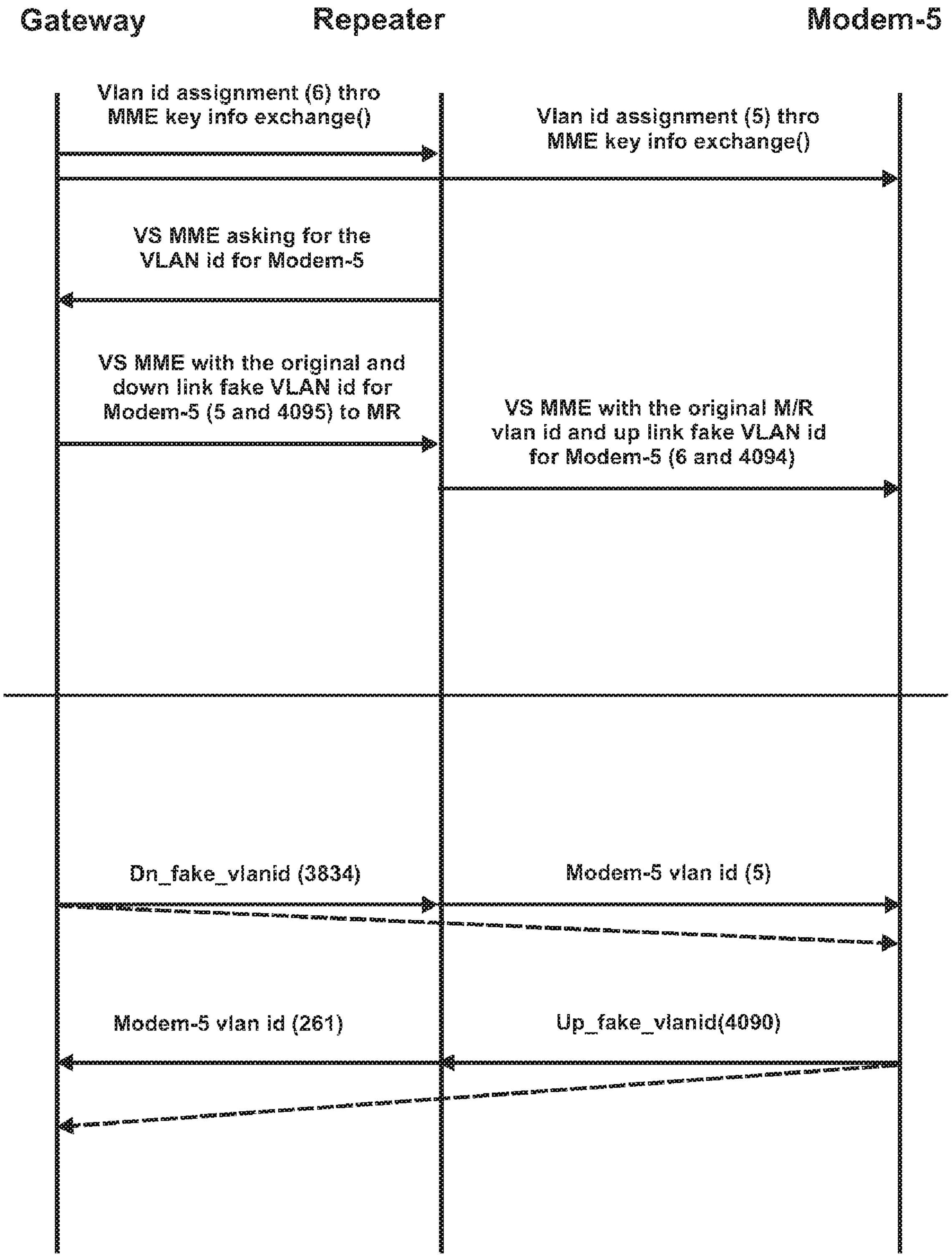
FIG. 6 is a simplified network flow diagram illustrating the operation of a repeater system in a power line communication network.

FIG. 6 is a simplified network flow diagram illustrating the operation of a repeater system in a power line communication network. This diagram is merely an example, which should not unduly limit the scope of the claims. One of ordinary skill in the art would recognize many variations, alternatives, and modifications. For example, various steps as shown may be added, removed, modified, replaced, repeated, and/or overlapped.

Figure 7:
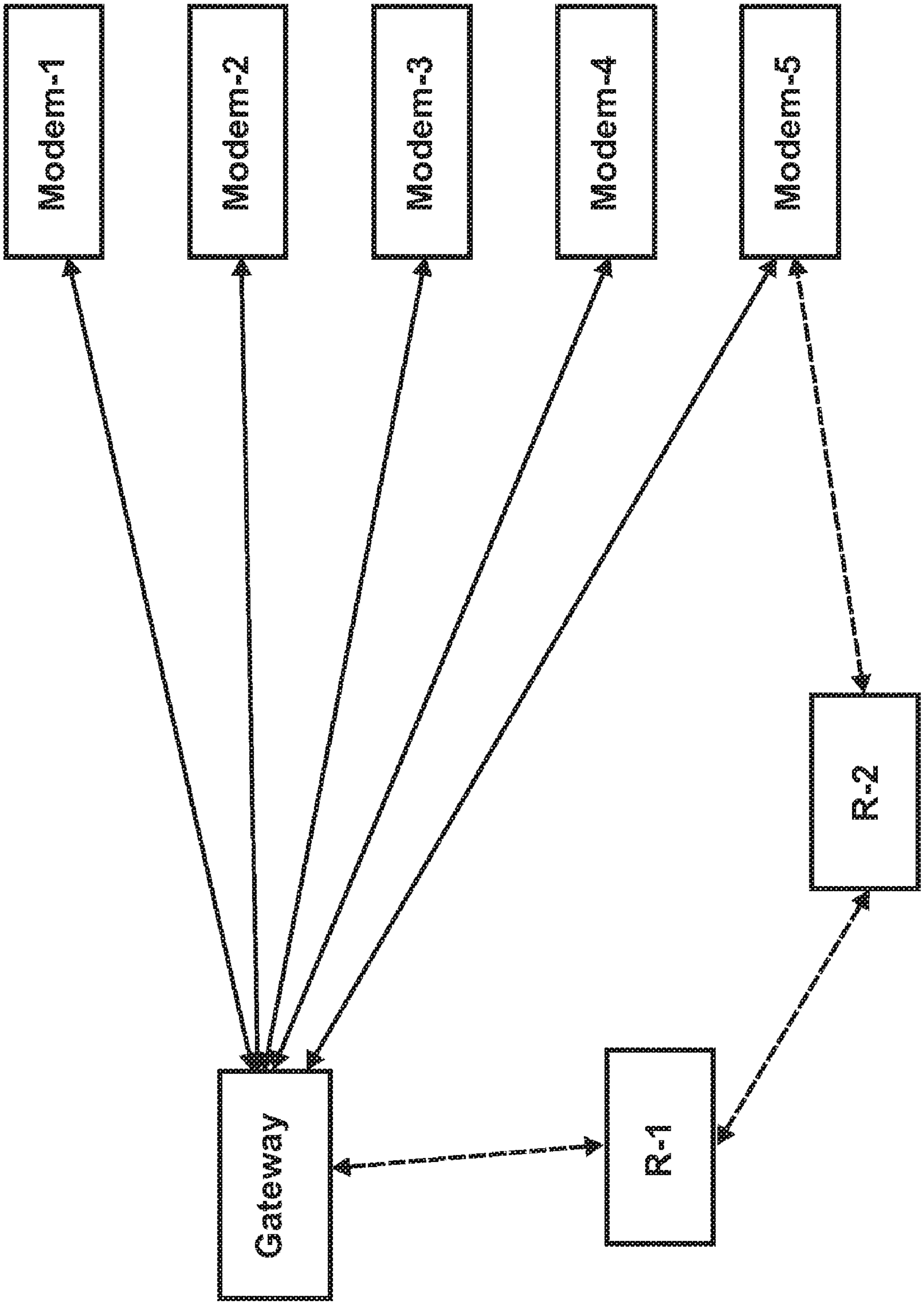
FIG. 7 is a simplified diagram illustrating a power line network system that uses two repeater systems according to an embodiment of the present invention.

FIG. 7 is a simplified diagram illustrating a power line network system that uses two repeater systems according to an embodiment of the present invention. This diagram is merely an example, which should not unduly limit the scope of the claims. One of ordinary skill in the art would recognize many variations, alternatives, and modifications. As shown in FIG. 7, the Modem 5 communicates with the gateway through repeaters 1 (R-1) and 2 (R-2). An exemplary operation of the power line network is illustrated according to Table 3 below:

TABLE 3

| | Down link | Up link |
|---|---|---|
| Gateway | If the gateway is transmitting the packet over the power line which is intended to Modem-5 or the device connected behind it then it has to insert lev1__dnfake__vlanid (4095)in the packet. If the gateway is transmitting the packet over the power line which is intended to the repeater or the device connected behind that then it has to insert VLAN ID of the R-1 (6) in the packet. | When Gateway receives the packet it will process the packet normally, it is not required to do any extra check on the packet. |
| Repeater-1 | If the R-1 is transmitting the packet over the power line which is intended to Modem-5 or the device connected behind it then it has to insert lev2__dnfake__vlanid (4094)in the packet. If the R-1 is transmitting the packet over the power line which is intended to the R-2 or the device connected behind that then it has to insert VLAN ID of the R-2 (7) in the packet. | When M/R-1 receives the packet it will check for the VLAN ID, if VLAN is 4093 then replace the VLAN id by Modem-5 VLAN id (5) and send it over the power line. If the VLAN ID is same as its then process the packet normally, it is not required to do any extra check on the packet. |
| Repeater-2 | If the R-2 is transmitting the packet over the power line which is intended to Modem-5 or the device connected behind it then it has to insert Modem-5 VLAN ID (5)in the packet. If M/R-2 is transmitting the packet over the power line which is intended to the R-1 then it has to insert VLAN ID of the R-1 (6) in the packet. If R-2 is transmitting the packet over the power line which is not intended to above 2 then it has to insert lev2__uplink__vlanid (4093) | When M/R-2 receives the packet it will check for the VLAN ID if VLAN ID is 4092 then replace the VLAN ID by 4093. if VLAN ID is 4094 then replace the VLAN ID by VLAN ID of modem-5 (5) and send it over the power line. If the VLAN ID is same as its then process the packet normally, it is not required to do any extra check on the packet. |
| Modem | If Modem is transmitting the packet over the power line then it has to insert up__fake__vlanid in the packet (assumed Modem can talk only to gateway or devices connected behind it. No Modem to Modem communication is allowed) | When Modem receives the packet it will process the packet normally, it is not required to do any extra check on the packet. |

As shown in FIG. 6, the gateway provides an VLAN ID assignment to through the MME key information exchange to the repeater. Also, the gateway, provides and VLAN ID key assignment, which is different, to the modem 5. The repeater requests an VLAN ID that is for the modem 5 through VS MIME from the gateway. The gateway then sends the VS MME with the original and downlink VLAN ID for the modem 5 (with the proxy address of 4095) to the repeater, which in turn sends to the modem an VS MME with the original repeater VLAN ID and uplink VLAN ID for the modem.

During operation, the gateway sends data packets to the modem 5 through the repeater using the downlink ID for the repeater and the VLAN ID of the repeater. For the modem to send data packet to the gateway through the repeater, an uplink VLAN (4090) is used for the repeater, and then the modem 5 VLAN ID is used for the gateway.

Figure 8:
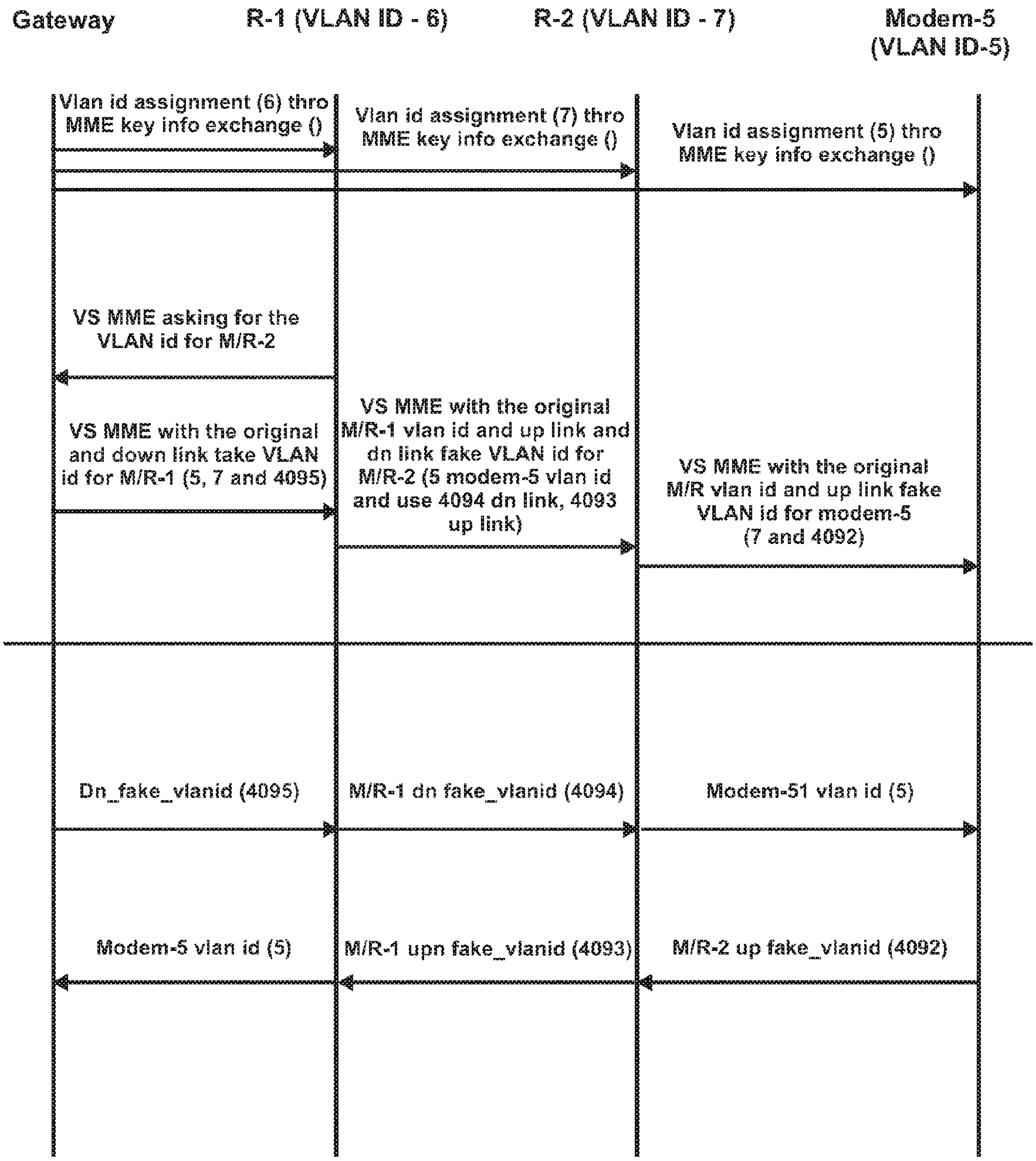
FIG. 8 is a simplified network flow diagram illustrating the operation of a repeater system in a power line communication network.

FIG. 8 is a simplified network flow diagram illustrating the operation of a repeater system in a power line communication network. This diagram is merely an example, which should not unduly limit the scope of the claims. One of ordinary skill in the art would recognize many variations, alternatives, and modifications. For example, various steps as shown may be added, removed, modified, replaced, repeated, and/or overlapped.

As shown in FIG. 8, the gateway applies VLAN ID assignment to the repeaters and the modem 5 through MME key information exchange. The repeater 1 requests from the gateway a VLAN ID for the repeater 2 using VS MME. The gateway in response provide VLAN ID for the repeater 1 through the VS MME. The VLAN ID for the repeater 2 is sent from the repeater 1. The VLAN ID for the modem 5 is sent from the repeater 2.

During the data packet transmission process from the gateway to the modem 5, the gateway uses the proxy VLAN ID of 4095, and repeater 1 uses the proxy VLAN ID of 4094, and the modem 5 uses the VLAN ID of 5. During the data transmission process from the modem 5 to the gateway, the modem uses the proxy VLAN ID of 4092, the repeater 2 uses the proxy VLAN ID of 4093, and the gateway receives the data packet with the modem's VLAN ID of 5.

Table 4 below illustrates a bridge table for storing VLAN ID assignment information for an exemplary situation:

TABLE 4

| Modem MAC | VLAN id | Mode of operation | "Downlink Proxy" VLAN ID | "Uplink Proxy" VLAN ID |
|---|---|---|---|---|
| Modem-1 MAC | 1 | | | |
| Modem-2 MAC | 2 | | | |
| Modem-3 MAC | 3 | | | |
| Modem-4 MAC | 4 | | | |
| Modem-5 MAC | 5 | Modem | 4095 | 4094 |
| Repeater MAC | 6 | Repeater for Modem-5 | | |

Under the situation, the modem 5 is connected to gateway using the repeater, who has a VLAN ID of 6. When both Modem-5 and Modem/Repeater-6 sends the packet to the Gateway the packet sent by Modem-5 will have Uplink Proxy VLAN ID (4094) in the packet where as packet sent by Repeater-6 has the actual VLAN ID of Modem-5 (5).

When the Gateway receives the packet with the proxy VLAN ID that indicates that the Gateway can see the Modem-5 directly without using Repeater, the Gateway informs the Modem-5 to insert its own VLAN ID (5) instead of PROXY VLAN ID (4094) by sending the Vendor specific MME. As a result, the future routing does not go through the repeater (i.e., the gateway determines it is unnecessary to do so).

In an embodiment, the Gateway periodically polls for the Modem status (e.g., check alive) to refresh its Bridge table. As soon as the Modem looses the connection before purging the entry for that modem from the Bridge table, Gateway software can check for the proxy VLAN id for that modem. For example, if proxy VLAN ID is present for that modem (e.g., it indicates the presence of repeater in between). Instead of purging the entry in the bridge table, Gateway can send the Vendor specific request to Modem, requesting it to use the repeater. If the Gateway gets the Vendor specific response from the Modem, then it can retain the existing details. Otherwise the gateway may simply remove the entry from the Bridge table. In this case Modem might loose the data (connection) for some duration. In an embodiment, the duration depends on the timer used for refreshing the bridge table.

It is to be appreciated that the method describe above reduces the frequency of back and forth switching between with and without repeater. For example, the high efficiency can be achieved through the Gateway and Modem software.

As an example, the VLAN IDs are assigned to ensure proper addressing. In an embodiment, the VLAN ID for broadcast data packet is assigned to "0". The VLAN IDs for modems start from 1 with an increment of 1 (1 to 2048). The VLAN ID for network services for pass through traffics (e.g., repeaters, etc) start from 2049 with an increment of 1 (2049, 2050). The proxy VLAN IDs (Modem repeater) starts from 4095 with a decrement of 1 (4095, 4094, 4093 . . . ). As an example, the above assignment does not impact on the VLAN ID for pass-through data packets. The same method can be used with VLAN pass-through implementation.

Typically, in the power line network, the modem can communicate with repeater, and repeater can communicate with gateway, while the modem does not communicate with gateway directly. In certain situations, when the modem communicates with gateway directly, the continued communication may causes the packet to be lost. For example, the modem is able to communicate with gateway directly when the PLC signal between them is good strong. In other word, when the attenuation between modem and gateway is less than a threshold level (e.g., 50 dB), the modem is better off communicating with gateway directly.

According to an embodiment, the present invention provides a method for power line communication network. The method includes providing a virtual local area network (VLAN), which VLAN includes at least a repeater, a client, and a gateway. The VLAN is associated with a network encryption key. The repeater is associated with a first identification. The client is associated with a second identification. The gateway is associated with a third identification. The first identification and the third identification are a service identification type. The second identification is a client identification type. The method also includes providing a power line network that is configured to transmit data through OFDM signaling. The method includes sending a first data packet in first format from the client through the power line network. The method additionally includes receiving the first data packet by the repeater through the power line network at through a first network interface. The method further includes converting the first data packet from the first format to a second format by a power line module of the repeater. The method further includes processing the first data packet by a network processor of the repeater. In addition, the method includes determining at least routing information based at least on the second identification by the network processor. Also, the method includes updating the first data packet by the network processor. Moreover, the method includes converting the processed first data packet from the second format to the first format. The method includes sending the processed first data packet to the power line network through the first network interface. Additionally, the method includes receiving the processed first data packet by the gateway. For example, the method is illustrated according FIGS. 2-4.

According to another embodiment, the present invention provides a system for a repeater in a power line network. The system includes a coupler being coupled to a power line network, which includes a virtual local area network (VLAN). The VLAN is associated with a first network encryption key. The system is associated with a first identification that is associated with a service identification type. The system also includes an analog front end module that is adapted to receive and send a first data packet in a first format. The first format comprises an orthogonal frequency division multiplex (OFDM) format. The analog front end module is coupled to the coupler. The first data includes a first segment and a second segment. The first segment includes a second identification, the second identification being associated with a client identification type. The system also includes a power line module being configured to receive and convert the first data packet from the analog front end from the first format to a second format and further being configured to convert a second data packet from the second format into a second format. The power line module is adapted to send a second data packet, the second data packet being associated with a third identification. In addition, the system includes a network processor that is configured to process the first data packet in the second format. The network processor is adapted to determine routing information based at least on the second identification. The network processor is further adapted to update the second segment to include information associated with the first identification. For example, the system can be illustrated according to FIGS. 2-4.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method, the method comprising:

receiving, at a first network interface of a repeater, a first data packet transmitted from a client using OFDM signaling through a power line network, wherein the first data packet is in a first format and includes an uplink VLAN identifier;

converting the first data packet from the first format to a second format by a power line module of the repeater;

processing the first data packet in the second format by a network processor of the repeater, wherein the processing comprises:

determining, by the network processor, at least routing information based at least on the uplink VLAN identifier of the packet and mapping the uplink VLAN identifier to a VLAN identifier of the client; and updating the first data packet by the network processor to include the VLAN identifier for the client;

converting the processed first data packet from the second format to the first format; and sending the processed first data packet to the power line network through the first network interface to a gateway.

2. The method of claim 1 further comprising:

receiving the first data packet from the client by the gateway;

determining by the gateway whether to receive the processed first packet from the repeater.

3. The method of claim 1 further comprising:

generating a second data packet by the network processor;

sending the second data packet through the first network interface.

4. The method of claim 1 wherein the first data packet comprises a first segment, the first segment including information for the VLAN identifier of the client.

5. The method of claim 1 further comprising sending receiving at the repeater a second data packet from the gateway to the client through the power line network, wherein the second packet includes a downlink VLAN identifier;

replacing the downlink VLAN identifier in the second packet with a VLAN identifier of the gateway; and forwarding the modified second packet to the client.

6. The method of claim 5 wherein the VLAN identifier for the gateway has an ID value of between 2049 to 4096.

7. The method of claim 1 wherein the VLAN identifier for the client has an ID value of between 1 to 2048.

8. The method of claim 1 wherein the first data packet comprises a broadcast data packet.

9. A system for a repeater in a power line network, the system comprising:

a coupler being coupled to a power line network, the power line network including a virtual local area network (VLAN), the VLAN being associated with a first network encryption key;

an analog front end module being adapted to receive and send a first data packet in a first format transmitted through the power line network, the first format comprising an orthogonal frequency division multiplex (OFDM) format, the analog front end module being coupled to the coupler, the first data including a first segment and a second segment, the first segment including a VLAN identifier;

a power line module being configured to receive and convert the first data packet from the analog front end from the first format to a second format, and further being configured to convert the first data packet from the second format into the first format, the power line module being adapted to send the first data packet converted from the second format to the first format; and a network processor being configured to process the first data packet in the second format, the processing comprising:

determining, by the network processor, at least routing information based at least on the VLAN identifier of the packet, wherein the VLAN identifier is an uplink VLAN identifier, and mapping the uplink VLAN identifier to a VLAN identifier of the client; and updating the first data packet by the network processor to include the VLAN identifier for the client.

10. The system of claim 9 wherein the second format comprises an IP format.

11. The system of claim 9 further comprising a network interface, the network interface being adapted to couple to a RJ45 connection.

12. The system of claim 9 wherein the first data packet comprises a broadcast message.

13. The system of claim 9 wherein the power line module includes a port, the port being configured to receive the first data packet and transmit the updated first packet.

14. The system of claim 9 wherein the virtual area network includes a gateway and a client, the gateway and the client being associated with the first network encryption key.

15. The system of claim 9 wherein the VLAN identifier for the client uses identification ID numbers allocated from a range reserved for client type identifiers.

16. The system of claim 9 wherein the uplink VLAN identifier uses identification ID numbers allocated from a range reserved for virtual link type identifiers.

17. The system of claim 9 wherein the first segment comprises a header.

18. The system of claim 9 wherein the first segment comprises a trailer.

19. The system of claim 9 wherein the second segment comprises data.

* * * * *